United States Patent [19]
Monford, Jr.

[11] 3,828,137
[45] Aug. 6, 1974

[54] DIGITAL COMMUNICATION SYSTEM

[75] Inventor: Leo G. Monford, Jr., Texas City, Tex.

[73] Assignee: The United States of America as represented by the Administrator of the National Aeronautics and Space Administration, Washington, D.C.

[22] Filed: Nov. 28, 1972

[21] Appl. No.: 310,034

[52] U.S. Cl. ........................ 179/15 AT, 179/15 BY
[51] Int. Cl. .............................................. H04j 3/12
[58] Field of Search ......... 179/15 A, 15 AT, 15 BA, 179/15 BS, 15 BY, 15 AL

[56] References Cited

UNITED STATES PATENTS 3,544,976 12/1970 Collins ........................... 179/15 AL

*Primary Examiner*—Ralph D. Blakeslee
*Attorney, Agent, or Firm*—Carl O. McClenny; Marvin F. Mattrews; John R. Manning

[57] ABSTRACT

A digital communication system for parallel operation of 16 or more transceiver units with the use of only four interconnecting wires. A remote synchronization circuit produces unit address control words sequentially in data frames of 16 words. Means are provided in each transceiver unit to decode calling signals and to transmit calling and data signals. The transceivers communicate with each other over one data line. The synchronization unit communicates the address control information to the transceiver units over an address line and further provides the timing information over a clock line. A reference voltage level or ground line completes the interconnecting four wire hookup.

12 Claims, 4 Drawing Figures

DIGITAL COMMUNICATION SYSTEM

ORIGIN OF THE INVENTION

The invention described herein was made by an employee of the United States Government and may be manufactured and used by or for the government of the United States of America for governmental purposes without the payment of any royalities thereon or therefor.

BACKGROUND OF THE INVENTION

1. Field of the Invention

This invention relates to data communication systems and more particularly to digital data communication system for use as digital telephone systems.

2. Description of the Prior Art

In modern communications systems it is frequently necessary to provide closed-loop communication schemes utilizing minimum interconnection wires. For example, in a space vehicle it may be desired to communicate voice or other transducer-derived information to any one of a plurality of different locations in the vehicle. Similarly, in military applications it may be necessary to transmit data on a closed communication network as for local distribution to tactical command posts or the like. Telephone systems of the digital type are particularly adaptable to these applications provided they may be operated without undue bulkiness or complexity and without the necessity for a central exchange type control system.

The multitude of circuit elements required in any digital communication system for use in a telephone operation in the prior art has been undesirably high. The number of component systems and system circuit components is a direct factor in determining the efficiency with which information may be transmitted in a data communication system. The interconnecting wires required between units in even a small installation has also been undesirably high. In an effort to reduce the size and the number of components used to transmit digital data in a telephone system, equipment engineers have turned to the use of multifunctional integrated circuitry. To date, however, it has been impractical to produce a digital telephone system utilizing a small number of interconnecting wires which could provide for the simultaneous transmission/reception from 16 or more telephone handset units simultaneously.

SUMMARY OF THE INVENTION

The present invention provides a straightforward and relatively inexpensive digital telephone system which provides relatively noise free data reception and transmission from a large number of individual transceiver units. The system of the invention utilizes one remote timing or synchronization unit while providing for the interconnection of a large number of transmitting and receiving stations through the use of a minimum number of interconnecting wires or leads. In the described form of the invention, sixteen or more transceiver units are coupled by only four separate leads.

Minimum circuit component count is achieved in the present invention by the double and triple sequential utilization of the circuit components which is done without diminishing the flexibility of the system parameters. Synchronization techniques are used in the invention so that the clock frequency or speed of the system may be varied from DC to a very high frequency rate without the operational frequency of the system being limited by inherent design limitations.

Accordingly, it is an object of the present invention to provide a digital communication system having sixteen or more parallel operational data units in which only four interconnecting wires are employed.

It is a further object of the present invention to provide a digital communication system which is synchronized from a remote synchronization unit which may be located in one of the data units.

It is a still further object of the present invention to provide a digital communication system requiring a reduced component count while retaining system flexibility by the multiple sequential utilization of circuit components.

Yet another object of the present invention is to provide a digital communication system having optimum low component count and cost in which a flexible number of units may be utilized.

The foregoing and other objects, features, and advantages are achieved in the digital telephone system of the present invention in which a single, remotely located (for example, in one of the data units) digital synchronization unit is utilized to establish a timing reference for a digital communication system comprising sixteen or more data transmission and reception units. The system synchronization unit provides clock pulses and address words to each of the data units. The data units employ novel digital modulator means for providing digital representations of analog voice wave forms or other analog data wave forms. Digital data is transmitted from each data unit in an eight bit word length time interval following an eight bit word length address word associated with that particular data unit. All address words are transmitted on an address line and all data words are transmitted on a separate data line. Means are provided in the data units for decoding and appropriately routing incoming message data signifying the receipt of a call or the receipt of data transmitted from a calling unit. Means are also provided for appropriately outputting, in the eight bit time slot associated with each data unit, the digitally modulated or encoded data from an input device.

The foregoing objects of the invention and other features and advantages of the invention will be more readily appreciated from the following specification, drawings, and the related claims.

The invention may be better understood from the following detailed description thereof when taken in conjunction with the accompanying drawings in which:

DESCRIPTION OF THE ILLUSTRATED EMBODIMENTS

Figure 2:
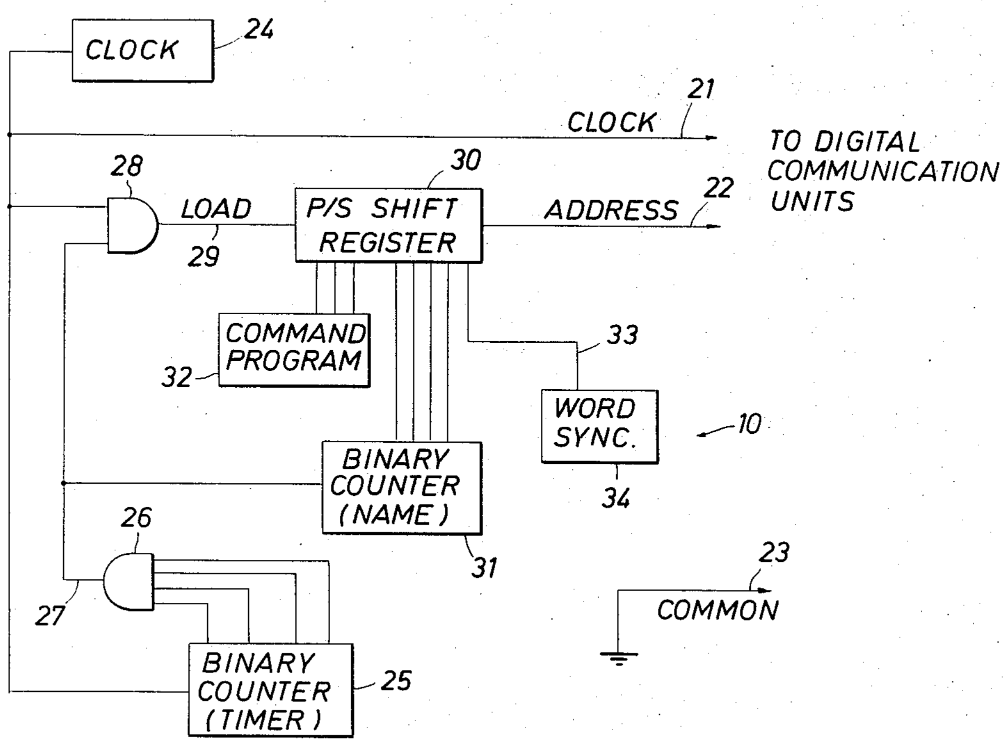
FIG. 2 is an operational block diagram of a digital synchronization unit utilized in the digital communication system of the present invention.
Figure 3:
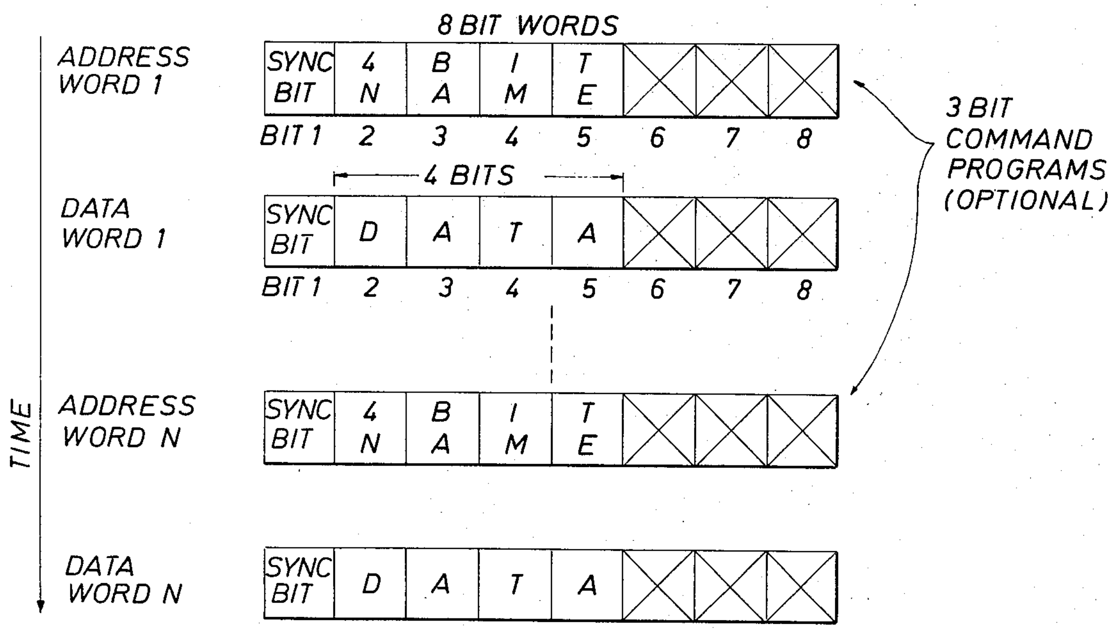
FIG. 3 is a schematic diagram illustrating the data format of the address words data transmitted over the address transmission line in the present invention and the data words which are transmitted over the data transmission line in the present invention.

Referring initially to FIGS. 2 and 3, the digital communication system of the present invention may be best understood by first examining the data frame format of the binary digital information transmittd from one data unit to another in the system.

A digital communication system such as that of the present invention requires synchronization of units in order that the digital data may be properly decoded. Proper decoding of the information also requires a preexisting knowledge of the data format. FIG. 3, illustrates the format of the data words and address words transmitted to and from the individual digital telephone units of the invention. In operation, only four interconnecting lines are required to connect data units to permit a data unit to either receive from or transmit to a second unit. These are: a clock line, an address line, a data line and a common reference voltage line such as a ground reference. Three of these lines are illustrated in FIG. 2 which depicts a block diagram of a digital synchronization unit 10 (not shown on FIG. 1) utilized in the present system. In the unit 10, the clock line is 21, the address line is 22 and the common or reference line is 23. Address words are transmitted by the single digital synchronization unit 10 to a plurality of digital communication units over the address line 22. All timing pulses originate in a clock 24 which transmits clock pulses on the clock line 21 to each of the digital communication units.

Referring now to FIG. 3, the format of the eight bit address information words transmitted from the digital synchronization unit to each of the digital communication units is shown in more detail. An address word comprises an eight bit binary word in which the first bit is a synchronization bit which signals the beginning of the address word. The synchronization bit in the address word is followed by a four bit binary name (generally a binary number which may vary from zero to 15) thus providing for up to 16 digital communication units to operate in a system. It will of course be appreciated that, if desired, more digital communication units could be employed by adding one or more address bits to the address word in a particular system or by assigning the same address to a plurality of units. The final three bits of the eight bit binary address word of FIG. 3 are not used in the embodiment of the invention to be discussed; however, these three bits can provide for up to eight binary commands to be transmitted from the synchronization unit to a particular one of the data units. These commands could comprise, for example, turn on, turn off, calibrate, change volume, change scale, or other appropriate commands which might be utilized. In the description of the digital communication system which follows, the three command bits are not utilized.

The data words of FIG. 3 follow generally the same format as the address words. The first bit is used as a synchronization bit. This is followed by four data bits derived from an input transducer of some type. Three bits, which again could be programmed commands if desired, follow the data bits. The data words occur sequentially in time to the address words as depicted in FIG. 3.

The clock 24 in the digital synchronization unit 10 of FIG. 2 provides clock pulses at a predetermined rate to a binary counter or timer 25. When the counter 25 reaches an all "ones" condition (overflow condition) it provides inputs on all four of its output lines simultaneously to an AND gate 26. When this condition occurs, the gate 26 provides an output pulse on a line 27. When an output pulse on line 27 from gate 26 reaches an AND gate 28 simultaneously with a clock pulse (on the opposite input of gate 28), an output signal from gate 28 is produced on a load command line 29. This signals a parallel-to-serial (P/S) shift register 30 to commence shifting its current contents out one bit at a time (serially) onto the address line 22. The contents of P/S shift register 30 is supplied thereto from a binary name counter 31 which counts up by one upon receipt of each timing pulse on line 27 from the binary timer counter 25 and gate 26. Additionally, at this time the three command bits (which are optional as previously described) may be loaded into shift register 30 in parallel from a command program register 32. The "word synchronization" bit is provided as an input to shift register 30 on a line 33 by a one bit register 34 which functions as a word sync register.

In operation, after a predetermined number of binary counts occur in the binary counter (or timer) 25 an output pulse is produced from the gate 26 on the timing line 27. This causes the address (name) counter 31 to increase by one unit. Simultaneously, the gate 28 produces an output signal on load line 29 which causes the parallel-to-serial shift register 30 to be loaded in parallel with the contents of registers 31, 32, and 34 and to commence shifting its contents out serially, upon the receipt of each succeeding clock pulse, on the address line 22. This provides an eight bit address word on address line 22 in the format as shown (address word 1) in FIG. 3. A predetermined command code which is entered into a command program register 32 may also be optionally provided. This command code could be manually entered if desired.

As will be subsequently described, the individual data units of the communication system can only receive or transmit data on a data line (55 of FIG. 1) in a time interval comprising an eight bit (duration) time slot immediately following an address word having its own name or I.D. code generated by the synchronization unit as described. This occurs when either the address of the telephone unit itself, of of the data unit which it is currently programmed to respond to, is recognized on the address line (56 of FIG. 1). This transmittal data is in the form of an eight bit binary word as shown in FIG. 3 labelled "data word 1." This data may comprise the modulated or encoded data such as voice modulation which is produced by a digital modulator 51 of FIG. 1. While any suitable digital modulator may be utilized for this purpose, it is contemplated that a digital modulation system such as that shown in the inventor's copending U.S. Pat. application Ser. No. 196,931, filed Nov. 9, 1971, may be utilized in the digital communication system of the present application. This digital modulation system is particularly suitable for the present purpose since it is frequency independent in its operation and may be synchronized with the remainder of the system by the receipt of clock pulses from a source such as the digital synchronization unit of FIG. 2. The final three bits of the data word may also comprise command information for transmission to another unit if desired. Again, it is not anticipated that these bits be used in the presently described apparatus.

A basis for the operational system of the present invention is provided by the digital synchronization unit of FIG. 2. This unit provides timing pulses and address words defining a data frame comprising 16 eight bit words, corresponding to sixteen or more data units. These address words are spaced apart in time by an eight bit time interval and these address words are produced on the address line 22. The words contain, occurring sequentially, the name or code number of each of the 16 digital communication units of the system. It will be appreciated, of course, that the address information need not appear sequentially, but could be programmed in any desired fashion or order. During the eight bit duration time slots which follow each address word, the digital telephone units may either transmit or receive digital information on the data line in the manner to be described.

Figure 1A:
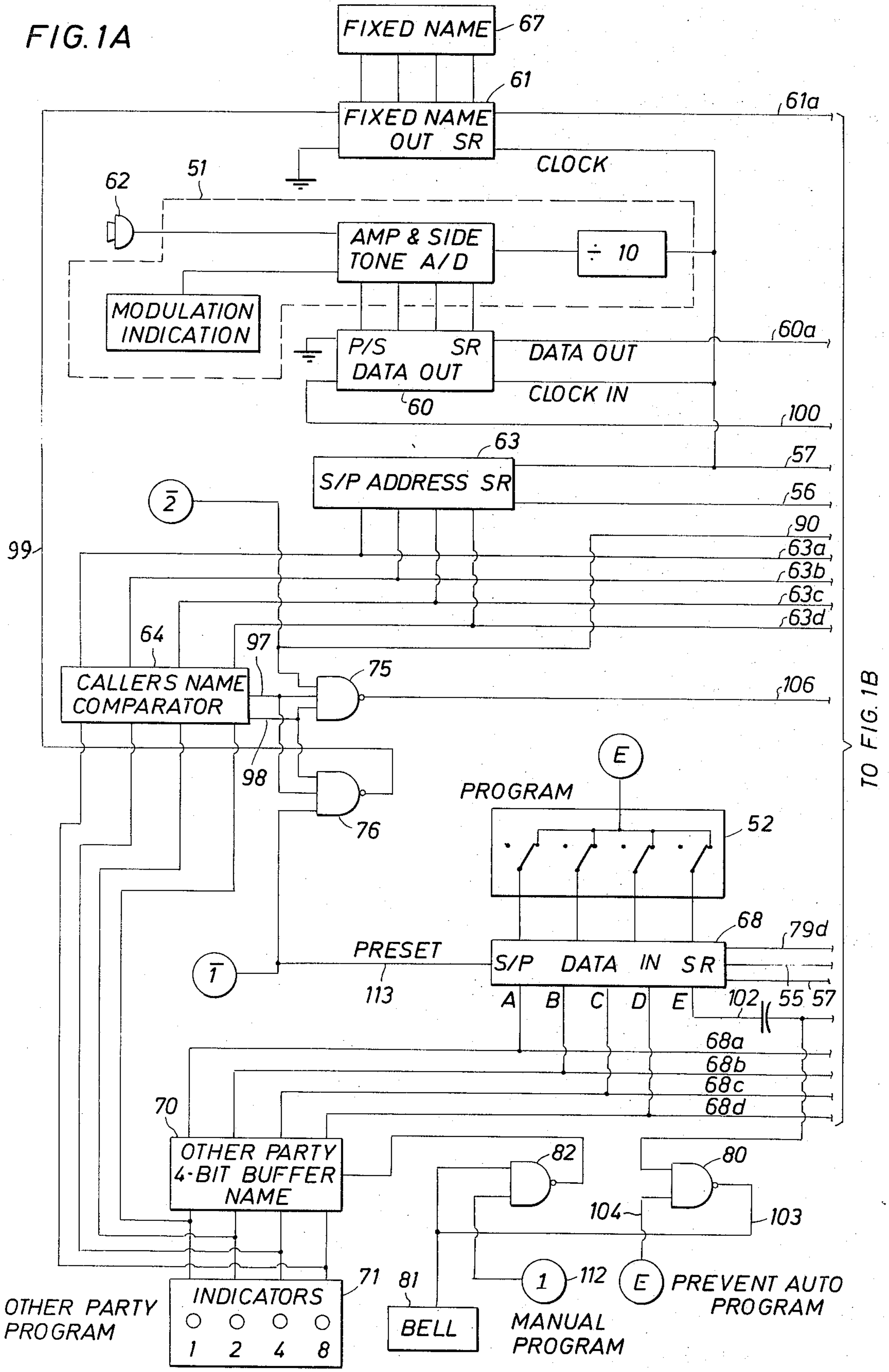
FIG. 1 includes FIG. 1*a* & 1*b* and is an operational block diagram of an individual digital communication data unit constructed in accordance with the teachings of the present invention.
Figure 1B:
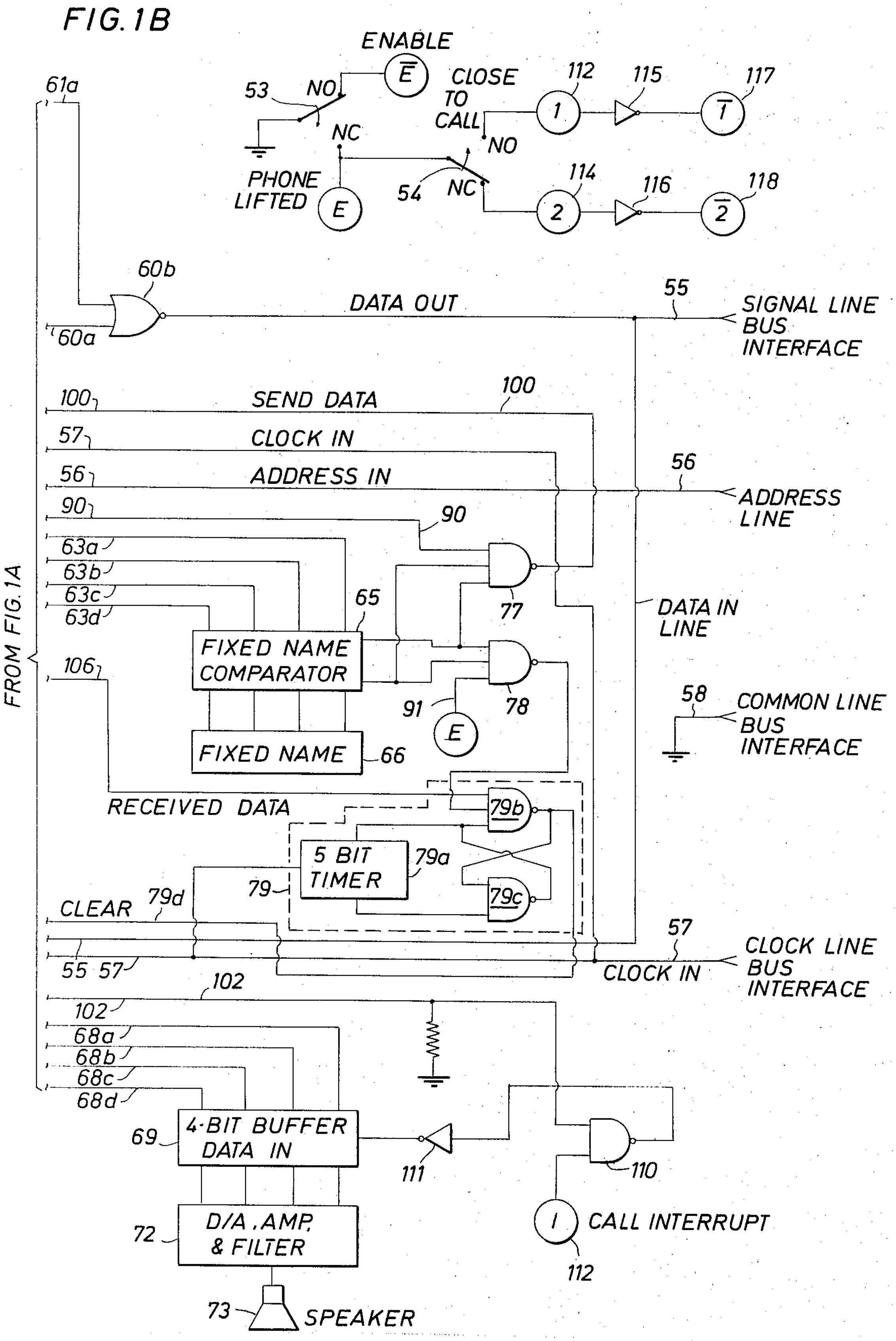

Referring now to FIG. 1, a typical data unit of the digital communication system of the present invention is shown in block diagram form. This system comprises a telephone hand set of the usual type which may be provided with a dial or system of switches 52 for entering the number of code name of the party to be called. This is illustrated in FIG. 1 as the program manual entry register 52. The hand set is represented by switch 53 which has two positions. Position $\bar{E}$ which is normally open represents that the phone is on the hook, and position E, the normally closed position, represents that the phone is off the hook. When the hand set is lifted from the cradle, theenable switch 53 of FIG. 1 is connected to position E in the manner shown. This allows programming of the register 52. Subsequently, when the called party's number has been entered into register 52, the "close to call" switch 54 is manually connected as shown by the arrows. Switch 54 is also a two position switch having a normally open connection (NO), Function 1 indicated at 112 and a normally closed connection (NC) Function 2 indicated at 114. To provide the necessary control of the circuitry, the NOT functions of 1 and 2, indicated at 117 and 118 respectively, are required. The NOT functions are formed by inverters 115 and 116 respectively. The effect of closing switches 53 and 54 will be subsequently described in the operation description of the unit. All data coming into the data unit enter on line 55, the signal line, and all address information enters on line 56. The clock signals from the digital clock 24 of the remote synchronization unit of FIG. 2 enter on line 57. Finally, the fourth unit connecting wire required for operation of the system is a common ground connection on line 58.

A parallel-to-serial shift register 60 is provided which is interconnected with the described digital modulation system 51. This shift register provides the digital data which is output serially on line 60*a* to a NOR gate 60*b*. A fixed name output is also provided from a parallel-to-serial fixed name output shift register 61 in a manner which will be subsequently described. The output from register 61 forms the second input line 61*a* of NOR gate 60*b*. The gate 60*b* provides the digital data which is output serially on line 55 from the telephone unit when it is time for the particular data unit to transmit. In the example shown, input data is derived from a conventional analog signal-producing microphone 62. The voice data from the microphone 62 is supplied to the digital modulating system 51 whose output is supplied in parallel to shift register 60.

Address signals arriving on address line 56 are provided to an eight bit serial-to-parallel address shift register 63 and accumulate there. The contents of the shift register 63 are provided in parallel to a caller's name comparator 64 and fixed name comparator 65 via interconnecting lines 63*a–d*. The fixed name comparator 65 is also supplied with input from a fixed name register 66. This register contains the fixed name or code of the unit being described in the same manner as fixed name register 67. Input data from this and other units are serially supplied from the data or signal line 55 to a data input serial-to-parallel shift register 68. Output signals are supplied in parallel from the register 68 by connecting lines 68*a–d*, to two four bit binary buffer memories 69 and 70. These are respectively, a four bit buffer "data in" memory 69 and a four bit "other party name" memory 70. The contents of the four bit "other party name" memory are supplied to an indicator 71 which may comprise a light emitting diode display (LED). The output of the four bit "data in" buffer memory 69 is supplied to a digital-to-analog converter amplifier and filter system 72. The system 72, which may be of conventional design such as a resistive ladder D/A converter, converts the digital data to an intelligible analog signal and drives a speaker 73.

The output of the "other party name" buffer memory 70 is also supplied to a caller's name comparator 64. The comparator 64 produces outputs on lines 97 and 98 when its two four bit inputs match. The output of the caller's name comparator 64 is supplied to two NAND gates 75 and 76 over lines 97 and 98. The output of the fixed name comparator 65 is supplied to two NAND gates, a "send data" gate 77 and a "receive other party gate" 78. The output of the "receive other party" gate 78 is supplied to a "five bit timer-clear register" signal generator 79. The signal generator 69 includes a five bit timer 79*a* and NAND gates 79*b* and 79*c* interconnected to form a bistable latch.

The output of the serial-to-parallel input data shift register 68 is also supplied by an overflow line 102 to one input of a "being called" NAND gate 80. The output of "being called" gate 80 is used to ring a bell 81. The output of gate 80 also supplies one input of a second NAND gate 82 which is conditioned by a manual program signal. This manual program is affected when the "close to call" switch 54 is connected. When this occurs the gate 82 causes the "other party name" memory 70 to be loaded in parallel with the contents of shift register 68. This also enables a "Translate data" NAND gate 110 (see "call interrupt" breakpoint 112) which conditions the "four bit buffer data in" memory 69, via an amplifier 111. This permits incoming voice data to reach the D/A amplifier and filter circuit 72 for conversion to analog form once the call is initiated by closing the switch 54.

The operation of the system of FIG. 1 may be best understood by an explanation of the process of signal sequences which serves for calling another party and for receiving a call from another party. It will be recalled in this discussion that the individual telephone or data unit of the present system can only transmit or receive data following the receipt of an address word containing a) its own coded address number or, when programmed to receive, b) the programmed address number or name of a calling party or party to be called which is manually entered into the system via the program register 52 or automatically entered by a calling party in the manner to be described.

With the telephone receiver on the hook, switch 53 is in its "not enabled" or $\bar{E}$ position, and switch 54 is in its normally closed (NC) or Function 2 position. In this position the data unit is inoperative and it is not enabled to receive or transmit data. Addresses entering shift register 63 on address line 56 are supplied to the "fixed name" comparator 65 and the "caller's name" comparator 64 via lines 63*a–d*. The fixed name comparator 65 compares the received address with the fixed name supplied from the fixed name register 66. However, because the unit is not enabled even though the positive comparison may be effectuated and an output signal produced from comparator 65, no output signal is provided from gate 77 because no conditioning signal for gate 77 is present on line 90 which is connected to breakpoint 118. Also, no output signal is produced from "receive other party" gate 78 because no conditioning signal which would be necessary for a gate 78 output to occur is provided on line 91 when the telephone receiver is on the hook, position $\bar{E}$. Thus the system merely cycles continuously in a disenabled mode and is unable to receive or transmit data as long as the telephone hand set switch 53 and manual switch 54 are in their unoperative positions E and 2 respectively. It will be noted in this operation that voice data is not received until the called phone is lifted; however, as will be described, the data word containing the calling party's name must be received with the called party's phone on the hook.

When it is desired to place a call to another unit in the digital telephone system, the first step of placing the call is to lift the telephone receiver or hand set from the hook. This places the switch 53 into the enabled position E. This enables the operation of the program register 52 into which the number of the party being called may be manually entered as by dial or switches, etc. When the "party to be called" code number is manually entered in the program register 52 when the close to call switch 54 is manually actuated. When this switch 54 is actuated, an enable signal is provided via breakpoint 112 and causes the gate 82 to produce an output signal which loads the "other party name" buffer memory 70 with the contents of the serial-to-parallel data shift register 68. Register 68 at this time, contains the manually programmed name of the party to be called (from program register 52). This name is thus entered into the "other party name" memory 70 and displayed in the indicators 71 and is also supplied to the caller's name comparator 64. If desired a PRESET party's name may be called by previously entering this name into the program register 52 and manually activating the switch 54 without lifting the telephone handset. This causes a preset signal to appear on PRESET line 113, thereby loading serial-to-parallel shift register 68 with the name. From this point on, the generation of a signal to this party is actuated as just described for a manual call.

When the called party's address is generated by the digital synchronization unit of FIG. 2 and is entered into the serial-to-parallel address shift register 63 over the address input line 56 (corresponding to line 22 of FIG. 2), it is supplied to the "callers name comparator" 64 by the serial-to-parallel address shift register 63. An output signal is then produced from the caller's name comparator on its output lines 97 and 98 as this address now matches the contents of the "other party name" buffer memory 70. The gate 76 then produces an output pulse on output line 99 which conditions the "fixed name out" parallel-to-serial shift register 61 to transmit the name of the calling unit on output data line 55. Output line 55 will then, in the time slot allocated for the called units data, contain the address of the calling unit.

At the addressed (called) data unit, the address information appears on line 56 (corresponding to line 22 of FIG. 2) from the digital synchronization unit of FIG. 2. Normally, when the "called party" telephone receiver is on the hook, the output of the "fixed name" comparator 65 causes an output pulse on the "send data" line 100. In the usual case this would cause no data to be sent out as there would be no data contained in the parallel-to-serial shift register 60 since the handset is on the hook. However, in this instance the calling party data unit has placed his own unit's number (name) in the time slot immediately following the called party's address word. Thus, data now appears on the data input line 55 in this time slot. This data is entered into the serial-to-parallel shift register 68 and since the data is address or name data (containing a fifth or sync bit as in FIG. 3), it causes an overflow pulse to appear on line 102. With the telephone hand set at the called party phone on the hook, the gate 80 is conditioned via line 104 to produce an output on line 103 on receipt of an input via line 102. Upon receipt of the pulse on line 102, the output on line 103 causes the bell 81 to sound to page the called party. The data from the serial-to-parallel shift register 68 (i.e., the "calling party" name) is also displayed on the "other party indicator" 71 as it is presented to the "other party name" buffer memory 70 in this process.

When the called party's telephone bell is ringing and he lifts his receiver off the hook, the conditioning signal on line 104 is removd from the NAND gate 80 and the bell stops ringing. This also locks the "other party name" in the "other party name" buffer memory 70 at the party's telephone. From this time until the set is reprogrammed the calling party's name appears in the buffer memory 70 of the called party's telephone.

When the called party answers the telephone and the calling party's name is locked in his "other party name" four bit buffer memory 70, the next time the calling party's address appears on the address line 56 it matches the name in the "other party name" buffer memory 70 of the called party's unit. The address on address line 56 is supplied to shift register 63 and this signal is presented to the caller's name comparator 64. Since the receiver of the called party is now off the hook and the names match, an output signal is produced from gate 75 on the received data line 106. This causes the "five bit timer-clear circuit" 79 to function. In this case, circuit 79 functions not to produce a "clear pulse" on line 79*d*. Normally the "clear circuit" 79 would function to produce a "clear pulse" five bits later in time to clear the contents of serial-to-parallel "data input" shift register 68. Thus when the eight bit data word arrives from the calling party over line 55, the data is allowed to enter serial-to-parallel shift register 68. The data is then presented to the "data in" buffer register 69. The data is supplied from the four bit buffer "data in" register 69 to a digital-to-analog converter 72 where it is converted into analog form, amplified, filtered, and sounded on speaker 73.

Once the circuit is thus established for a two-way conversation, the information-containing data is transmitted on the data line 55 in the time slot immediately following the address word's occurrence on address line 56 for both the transmitting station and the called party station. For example, assume station number 1 is calling station number 2. In the eight bit time slot following the address word for station number 1, data is output from the parallel-to-serial shift register 60 in station number 1 on the data output line 55 and is received at station number 2 in its "data in" shift register 68. Similarly, in the time slot after address 2 occurs on line 56, station number 2 may transmit data out from its parallel-to-serial shift register 60. This data is received in "data in" buffer input memory 69 in station number 1 over serial-to-parallel shift register 68 at station number 1.

To summarize the operation, a circuit is established by the calling party by entering the called party's name through the program register 52. The calling party's name is transmitted to the called station where it is received and decoded by the called station. The number of the calling party is entered into the "other party" buffer memory 70 at the called station and the called station's bell rings. Thus, the called station contains the calling station's name in its "other party name" memory at all times thereafter and vice versa. When this condition is established, each time slot following the address word transmitted from the data synchronization unit of FIG. 2 is followed by the data transmitted by that particular sending unit. In this manner up to eight simultaneous two way conversations may be carried on utilizing the digital telephone system of the present invention. As a common timing and synchronization circuit (for example that of FIG. 2) is used for all sixteen units of the data system, synchronization of all units is assured. Also the design of the system permits data transfer at a rate determined solely by the frequency of the clock oscillator 24 of FIG. 2. This frequency may be varied from DC to the maximum frequency handling capabilities of TTL (transistor-transistor logic) circuit capability. This allows the interrogation techniques to be tailored for various data rates as system requirements vary. An exemplary variation is the use of more or less telephone units in a particular system.

It will be appreciated that the communication system of the present invention is capable of various modifications. By way of example rather than limitation, a busy signal could be initiated when a called party's data sync bit is present prior to pushing the "close to call" switch. With this modification, the "call" function would be disabled. Additionally, conference calls (group messages or instructions) could be initiated by a one-way disable bush signal. "Conferees" could listen into the group message or instructions by simply calling the same number. Full conference calls could be conducted by having all phones monitor the data line and intercept all data words instead of just the one program. This could also be accomplished by reprograming selected phones to have the same number. If desired, automatic recall could be accomplished by memorizing the numbers of phones which have just called. As indicated by the foregoing comments, the disclosure and description of the present invention is illustrative and explanatory thereof, and various changes in the details of the illustrated construction may be made within the scope of the appended claims without departing from the spirit of the invention.

I claim:

1. A digital communication system having four interconnecting conducting lines including a data line, an address line, a clock line, and a reference voltage level or ground line and comprising:

a. a plurality of digital data transceiver units connected to said digital data line;

b. a central synchronization unit for producing on said address line, address control word digital information referencing each of said plural transceiver units in a predetermined time sequence, and for producing, on said clock line, clock pulse signals for use in timing the operation of digital circuitry in said transceiver units;

c. means in each of said transceiver units for serially receiving said address control word information, for decoding said address information, and for recognizing an address code corresponding to another particular transceiver unit and an address code for itself; and d. means responsive to said recognition means for serially transmitting on said data line digital data information from an input device upon recognition of its own address code and for receiving and decoding digital data from said data line upon recognition of the address of said other particular transceiver unit.

2. A system as defined in claim 1 further including in each transceiver unit address initialization means for transmitting its own address code information on said data line in the regular time sequence allocated for a second transceiver unit in said predetermined time sequence when it is desired to initiate a call to said second transceiver unit.

3. A system as defined in claim 2 further including means in each transceiver unit for signaling a calling signal upon receipt of address information on said data line from a second transceiver unit.

4. A system as defined in claim 1 wherein said data from a digital data input device comprises voice data from a digital voice modulator and said digital communication system comprises a digital telephone system.

5. A system as defined in claim 1 wherein said address control word digital information comprises binary numerical information words at least four binary digits in length, thereby providing for 16 or more such transceiver units in a four conductor system.

6. A digital communication system having 16 or more parallel operational data transceiver units interconnected by at least three lines, a clock line, an address line, and a data line and comprising:

a single digital data synchronization unit for providing on said address data line, address code digital information referencing said transceiver units and a single clock for producing, on said clock line, timing data for use by said transceiver units;

means in said transceiver units for transmitting digital data on said digital data line connecting all said transceiver units;

means in said transceiver units for generating a calling signal from a first transceiver unit to any or all of the other of said transceiver units;

means in said transceiver units for recognizing said calling signal from a particular transceiver unit; and means in said transceiver units responsive to said recognizing means for decoding digital information presented on said data line when a particular transceiver unit is called.

7. The apparatus of claim 6 and further including means for converting said decoded digital data to analog data form.

8. The apparatus of claim 6 wherein said digital signals are applied to said address line and said data line in serial digital data form, but are processed internally in said transceiver units in parallel digital data form.

9. The apparatus of claim 6 wherein said recognizing means comprises a serial-to-parallel register and plural digital comparator means including a caller's name digital comparator and a fixed name digital comparator each capable of producing output recognition signals on an output line when positive comparison is effected with a programmed digital input signal.

10. The apparatus of claim 6 wherein all the digital circuitry in said transceiver units are operated synchronously by clock signals from said single clock in said data synchronization unit.

11. The apparatus of claim 6 wherein said means for generating a calling signal from a transceiver unit comprises a parallel-to-serial shift register and means for supplying said register with a digital code representative of said first or calling transceiver unit, and means for coupling the output of said shift register onto said data line.

12. The apparatus of claim 6 wherein said digital information decoding means and said recognizing means share in common multifunctional, digital circuitry comprising a single multifunctional, digital serial-to-parallel shift register.

* * * * *